March 20, 1945.  L. BEEMAN  2,371,601

ELECTROMAGNETIC CIRCUIT CONTROLLER

Filed July 5, 1939  7 Sheets-Sheet 1

Fig. 1

INVENTOR.
LYLE BEEMAN
BY
ATTORNEY

March 20, 1945.   L. BEEMAN   2,371,601
ELECTROMAGNETIC CIRCUIT CONTROLLER
Filed July 5, 1939   7 Sheets-Sheet 3

Fig. 3

INVENTOR.
LYLE BEEMAN
BY
ATTORNEY

March 20, 1945.                L. BEEMAN                2,371,601
ELECTROMAGNETIC CIRCUIT CONTROLLER
Filed July 5, 1939                    7 Sheets-Sheet 4

INVENTOR.
LYLE BEEMAN
BY
ATTORNEY

March 20, 1945.   L. BEEMAN   2,371,601
ELECTROMAGNETIC CIRCUIT CONTROLLER
Filed July 5, 1939   7 Sheets-Sheet 5

Fig. 9

INVENTOR.
LYLE BEEMAN
BY
ATTORNEY

March 20, 1945.  L. BEEMAN  2,371,601
ELECTROMAGNETIC CIRCUIT CONTROLLER
Filed July 5, 1939  7 Sheets-Sheet 6

Fig. 10

INVENTOR.
LYLE BEEMAN
BY Ralph W Brown
ATTORNEY

March 20, 1945. L. BEEMAN 2,371,601
ELECTROMAGNETIC CIRCUIT CONTROLLER
Filed July 5, 1939 7 Sheets-Sheet 7

INVENTOR.
LYLE BEEMAN
BY
ATTORNEY

Patented Mar. 20, 1945

2,371,601

UNITED STATES PATENT OFFICE 2,371,601

ELECTROMAGNETIC CIRCUIT CONTROLLER

Lyle Beeman, Milwaukee, Wis., assignor to The Master Electric Company, Dayton, Ohio, a corporation of Ohio Application July 5, 1939, Serial No. 282,857

24 Claims. (Cl. 175—294)

This invention relates to electromagnetic circuit controllers for motors and other electrical equipment and has for a general aim to simplify and otherwise improve the construction and operation of control devices of that type.

An object of the present invention is to provide in an electromagnetic circuit controller a novel combination and arrangement of parts by which closing and opening of the circuit may be effected by manipulation of a single control element.

Another object is to provide in a device of the character mentioned a control element having a single actuating movement alternatively effective to close and open the circuit.

Another object is to provide a simplified overload relay for controllers of the character mentioned.

Another object is to provide, in a controller of the character mentioned, a plurality of load responsive devices operable upon a single switch to break the circuit in the event of an overload on either of a plurality of sides of the circuit.

Another object is to provide, in a circuit controller of the character mentioned, a single pilot switch manually operable to effect closing and opening of the circuit and also automatically operable to open the circuit in response to an overload thereon.

Another object is to provide a new and improved structural relation between the main switch and the electromagnetic actuator therefor.

Another object is to improve the construction and operation of the electromagnetic actuator in a controller of the character mentioned.

Another object is to provide an improved controller of the character mentioned which shall be more compact and capable of more economical production without impairing reliability of operation or facility of installation and inspection.

Other more specific objects and advantages will appear, expressed or implied, from the following description of two illustrative embodiments of the present invention.

The electromagnetic switch shown in Figs. 1 to 6 is enclosed in an appropriate housing 10 having a removable front cover 11 equipped with an appropriate cupped opening 12 fashioned to accommodate a single push-button control element 13 hereinafter further described.

All of the parts are supported by a mounting plate 14 removably fixed to the rear vertical wall of the housing by suitable means, such as a pair of hooked lugs 15 struck up from the wall of the housing and embracing the lower edge of the plate 14 and a removable screw 16 which passes through the upper end of the plate 14 and into the rear housing wall. The arrangement is such that, with the cover 11 removed, all of the parts may be removed, as a unit, from the housing, by removing the screw 16 and lifting the plate 14 away from the lugs 15.

Projecting forwardly from the upper portion of the mounting plate 14 is an insulating structure providing a rigid support for pairs of contact members 17 and 18 constituting parts of the main switch. This structure comprises a pair of end plates 20, secured through appropriate brackets 21 to the mounting plate 14, partition plates 22 parallel to the end plates 20, and interposed separator blocks 23, the several plates and blocks being formed of suitable insulating material and being securely bound together by through bolts 24. Each block 23 is recessed to form downwardly extending end portions 25 and 26 which, together with the adjacent plates, form an arc quenching chamber for the pair of contacts 17 and 18 included therebetween.

Each contact 17 constitutes the head of a stud 27 imbedded in one of the blocks 23 and in threaded engagement with the metal bracket 28 carrying a binding post 29; and the other contact 18 of each pair constitutes the head of a stud 30 imbedded in the same block 23 and in threaded engagement with a metal bracket 31 carrying a binding post 32. The main switch includes pairs of contacts 33 and 34 simultaneously movable into and out of contact with the pairs of fixed contacts 17 and 18, respectively. Each pair of moveable contacts 33 and 34 are electrically connected and supported by a metallic bridge piece 35 having at its mid point oppositely projecting ears 36 which extend into guide slots 37 formed in the parallel legs 38 of a U-shaped carrier bracket 39. Each bracket 39 is securely fixed at its base in a movable switch bar 40, the legs 38 of the bracket extending upwardly and closely embracing the bridge piece 35 in a manner to further guide the latter and thereby maintain the moveable contacts 33 and 34 properly aligned with their mating fixed contacts 17 and 18, respectively. Each bridge piece 35, and the contacts 33 and 34 carried thereby, are yieldably supported and urged upwardly by a compression spring 41 disposed within the bracket 39, the ears 36 cooperating with the upper ends of the slots 37 to limit upward movement of the contacts relative to their carrier bracket 39.

The movable switch bar 40 is formed of suitable insulating material. It is supported and guided at its ends by parallel metallic strips 42 which extend downwardly from the end plates 20 of the switch supporting structure through appropriate guide grooves 43 formed in the opposite ends of the bar 40. Each strip 42 is adjustably but securely anchored at its upper end in a groove 44 formed in the outer face of its supporting plate 20 (Fig. 5), a screw 45, extending through a slot 45' in the strip and threaded into the plate 20, serving to releasably fix the strip in the position shown. Upon loosening the screws 45 the strips 42 may be retracted lengthwise of their respective mounting grooves 44 in a manner to effect withdrawal thereof from the ends of the switch bar 40, to thus permit ready removal of the bar. Due to this arrangement, ready access may be had to both the fixed and movable contact members of the switch for the purpose of cleaning or replacing the same.

The switch bar 40 is actuated by an appropriate electromagnet preferably disposed below the main switch supporting structure. In this instance the electromagnet shown comprises a conventional winding or coil 46 supported by a core 47 comprising one leg of an L-shaped laminated field piece whose other leg 48 is securely fixed by bolts 49 to and between parallel struck-up portions 50 of the mounting plate 14. The electromagnet shown also includes an L-shaped laminated armature having one leg 51 disposed to cooperate with the projecting end of the core 47 and another leg 52 disposed to cooperate with the adjacent end of the leg 48 of the field piece. A pin 53, projecting laterally through the end of leg 52 and loosely engaged at its opposite ends in vertical slots 54 in ears 55 struck-up from the mounting plate 14, provides a shiftable fulcrum for the armature, permitting the armature to both swing and shift into and out of magnetic contact with the field piece. A pin 56, disposed below the leg 52 of the armature and removably mounted in a bracket 57, to be later described, limits the downward swing of the armature.

The leg 52 of the armature is connected through a pair of links 58 with the switch bar 40 to actuate the latter. These links 58, secured by screws 59 to the switch bar 40, extend downwardly therefrom in the direct line of motion of the bar, as determined by the guide strips 42, and are connected at their lower ends to the armature by a pin 60, which extends transversely through the armature and into engagement with the links.

Figure 1:
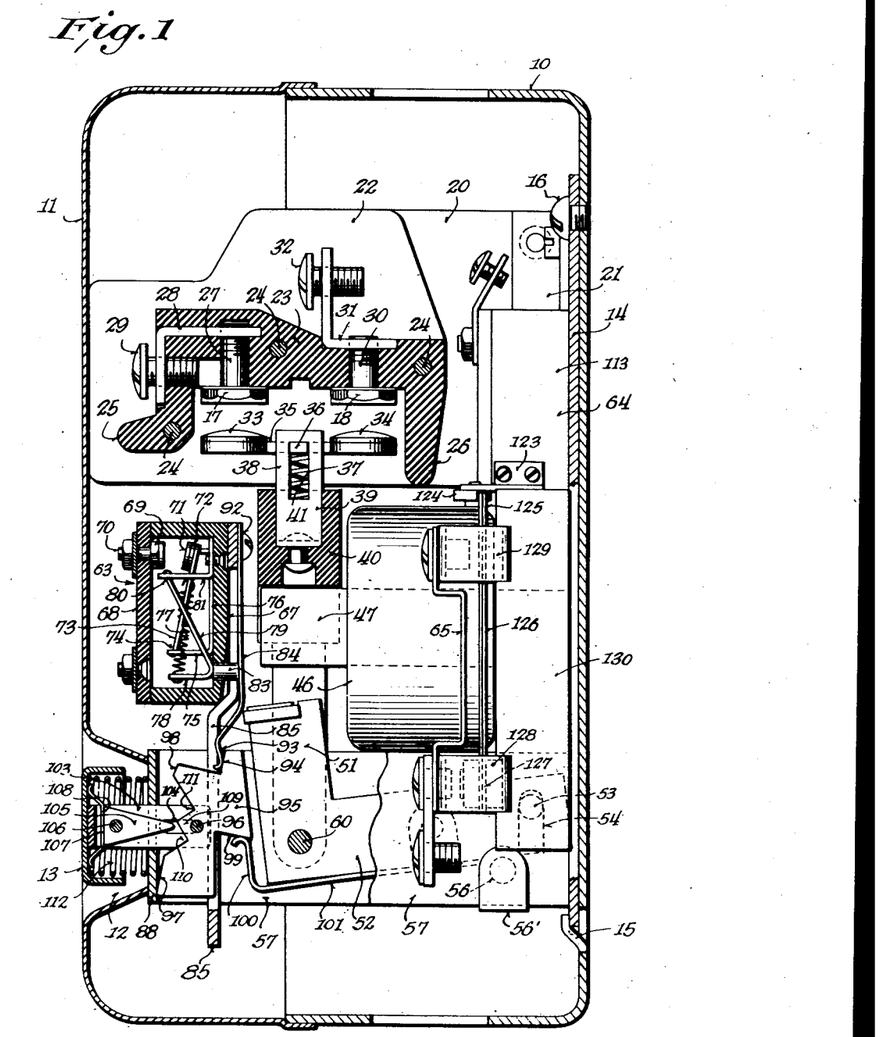
Figure 1 is a vertical sectional view of an electromagnetic switch constructed in accordance with the present invention, and illustrating the position of parts when the main switch is open.

The arrangement is such that, while the electromagnet is de-energized, the armature assumes the lower position shown in Fig. 1, in which position the switch bar 40 is lowered and the pairs of movable contacts 33 and 34 carried thereby are withdrawn from the pair of fixed contacts 17 and 18. In this position the armature is supported by the engagement of the leg 52 thereof against the stop pin 56 and by the engagement of the fulcrum pin 53 against the upper ends of the slots 54. When the coil 46 of the electromagnet is energized, however, the armature moves upwardly into the position shown in Fig. 2 with the legs thereof in contact with the legs of the field piece, and by this movement the switch bar 40 is elevated by the direct thrust of the links 58 and the pairs of contacts 33 and 34 are thereby elevated into pressure contact with the mating pairs of fixed contacts 17 and 18.

The stop pin 56 is mounted in a novel manner to render the same readily removable. It rests at its opposite ends in suitable perforations in the spaced parallel side members of the bracket 57 and is retained in place by a resilient steel clip 60 which spans the bracket 57 and which is provided with ends 61 bent in a manner to resiliently press against the opposite sides of the bracket and thereby frictionally retain the clip in place. The ends 61 of the clip normally overlie the ends of the pin 56 to retain the same against longitudinal displacement, the clip however being readily removable to permit lengthwise withdrawal of the pin 56.

It will be noted that the slots 54 are open at their lower ends, so that, upon removal of the stop pin 56, the armature of the electromagnet may be readily removed. Also, since retraction of the guide strips 42 permits withdrawal of the switch bar 40 and the contacts carried thereby, these parts together with the links 58 and armature constitute a sub-assembly which may be readily removed, as a unit, from the rest of the mechanism.

Figure 7:
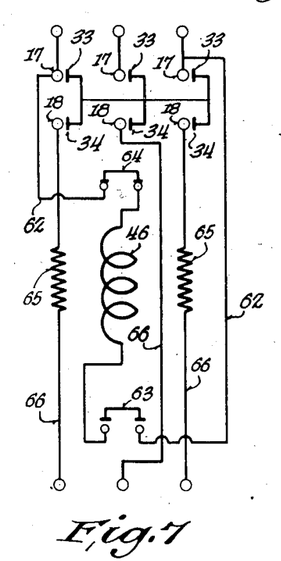
Figs. 7 and 8 are circuit diagrams.

As indicated in the diagram of Fig. 7, the coil 46 of the electromagnet is included in a shunt circuit 62 connected across two of those stationary switch contacts 17 which, in use, are directly connected with the power line. Included in this shunt circuit 62 is a manually controlled pilot switch 63, which is about to be described, and a normally closed thermal overload switch 64, which is controlled by two heater coils 65 connected in two sides 66 of the motor circuit in a manner to be hereinafter described.

Figure 2:
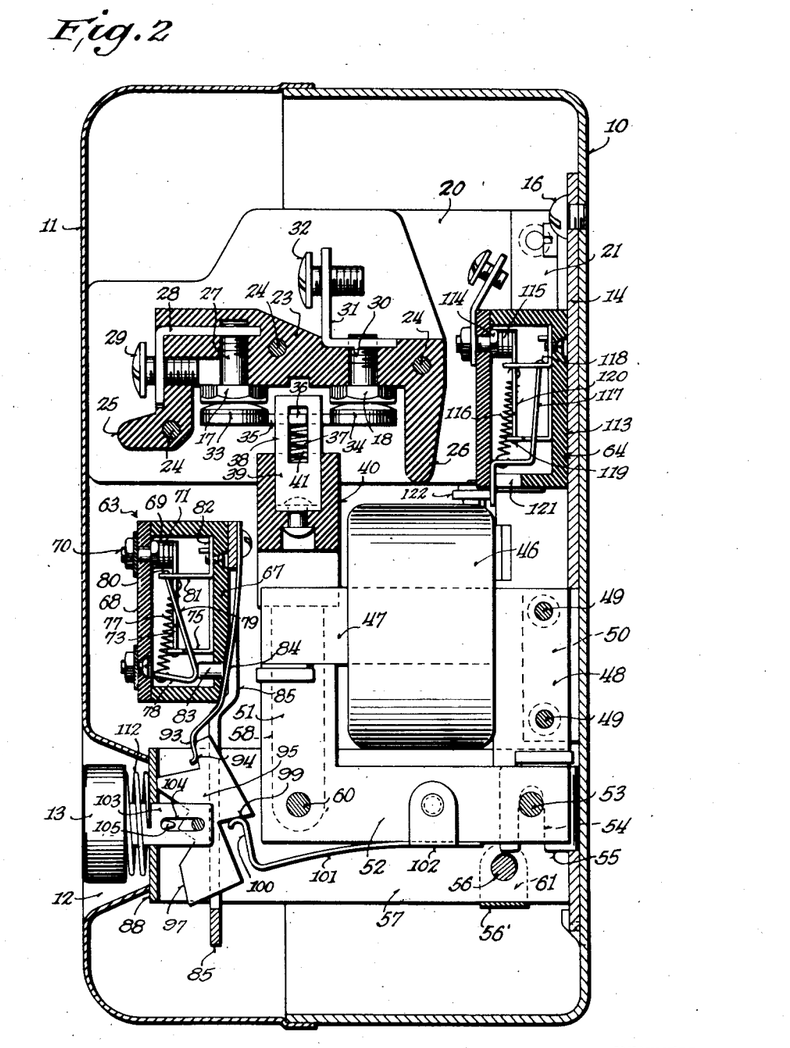
Fig. 2 is a similar view illustrating the position of the parts when the main switch is closed.
Figure 3:
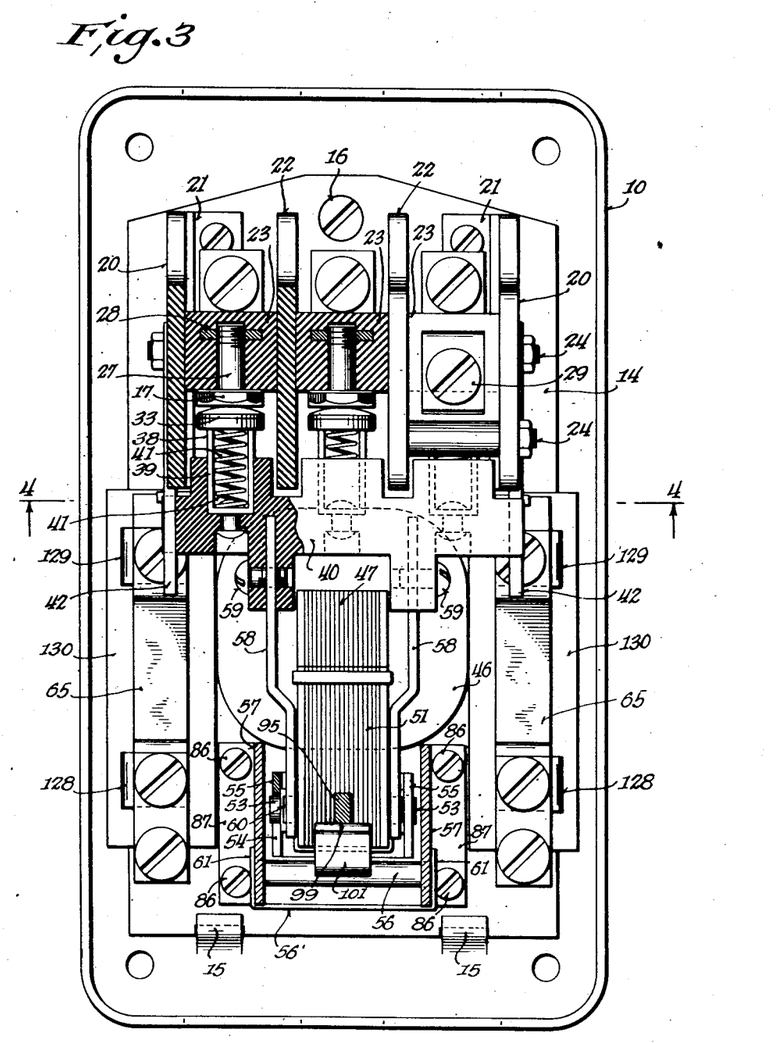
Fig. 3 is a front elevation partly in section with the pilot switch and fits control mechanism removed.
Figure 4:
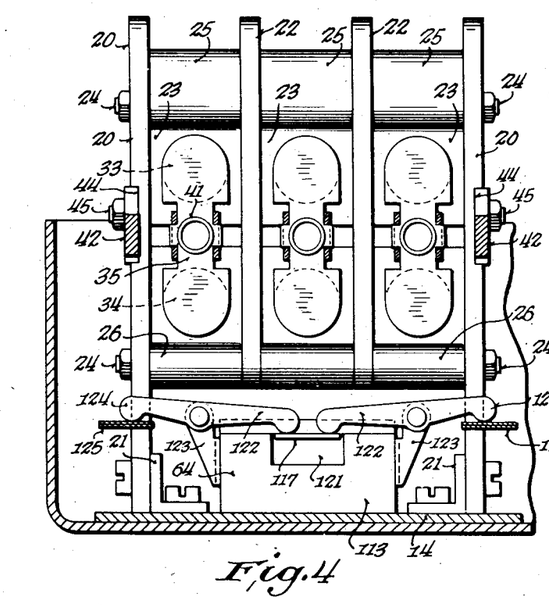
Fig. 4 is a sectional view taken along the section line 4—4 of Fig. 3.
Figure 5:
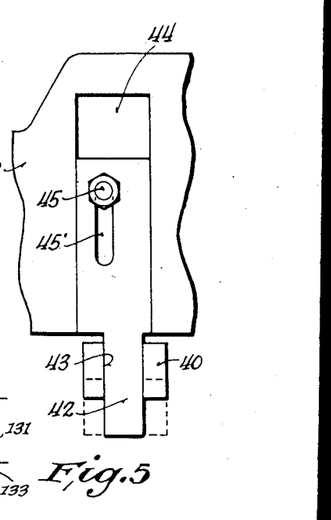
Fig. 5 is a fragmentary view illustrating the switch bar mounting means.
Figure 6:
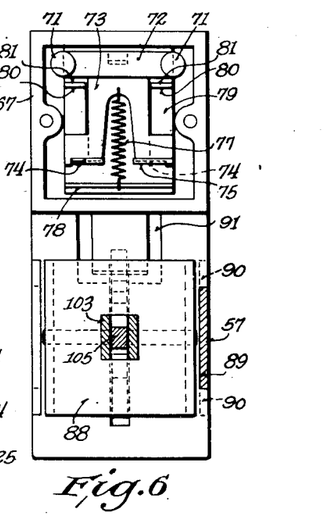
Fig. 6 is a front elevation of the pilot switch and its control mechanism.

The pilot switch shown in Figs. 1, 2, and 6 is of novel construction. It is enclosed in a housing 67 of insulating material having a removable cover 68 which supports a pair of stationary contacts 69, each provided with a terminal 70. Within the housing is a pair of cooperating movable contacts 71, carried and electrically connected by a metal bridge piece 72, and adapted to bridge across the contacts 69 when the switch is closed.

The bridge member 72 of the switch is mounted on the free end of a rocker plate 73, which is fulcrumed at its other end 74 against an upstanding portion 75 of a bracket plate 76 fixed to the bottom of the housing. The center of the rocker plate 73 is cut away to accommodate a tension spring 77, which extends from the switch carrying end of the rocker plate 73 beyond the fulcrumed end 74 thereof to the bent end 78 of a rocker control plate 79. This rocker control plate 79 is cut away at its center to clear the switch carrying plate 73 and its supports 75, and is fulcrumed, as at 80, against a pair of up-standing portions 81 of a bracket plate 82 fixed to the base of the switch housing.

It will be noted that with the parts of the switch in the position shown in Fig. 1, the line of tension in the spring 77, corresponding to the axis of the spring, lies at one side of the fulcrum point 74 of the switch carrier plate 73, so that the switch is retained by the spring in the open position shown. And it will be understood that as the control plate 79 is swung upon its fulcrum 80 toward the position shown in Fig. 2, the line of tension in the spring 77 shifts to the other side of the fulcrum point 74 of the switch carrier plate 73, thereby causing the switch to close with a snap action. Likewise, as the control plate 79 swings from the position of Fig. 2 toward the position of Fig. 1, the line of tension in the spring again shifts to the other side of the fulcrum 74, causing the switch to open with a snap action.

It will also be noted that, regardless of the position of the control plate 79, its fulcrum 80 always remains at one and the same side of the line of tension in the spring 77, so that the control plate is always urged by the spring 77 toward the position shown in Fig. 1, and the switch is thus normally biased toward the open position of Fig. 1. A push pin 83, guided in the base of the switch housing 67 and bearing against the control plate 79, is operable to force the plate 79 toward the position of Fig. 2 to thereby close the switch in the manner above described, the position of the pin 83 being controlled in this instance by a spring strip 84.

In this instance, the housing 67 of the pilot switch is mounted upon one end of an appropriate bracket plate 85, the other end of which is releasably interlocked with and supported by the bracket 57 hereinabove mentioned. The bracket 57 comprises two parallel plates 57 projecting from and fixed to the mounting plate 14 by screws 86 (Fig. 3) which extend through bent portions 87 at their inner ends. The bracket plate 85 extends between the plates 57 and is recessed at its opposite edges 89 to receive and interlock with those plates, as indicated particularly in Fig. 6, each plate 57 also being notched at its opposite edges 90 to receive and interlock with the bracket plate 85 in a manner to releasably but rigidly support the latter. The plate 85 may be readily released and removed from the structure 57 by spreading the plates 57 apart and out of the recesses 89 in the plate 85. The plate 85 is cut away, as at 91, to accommodate the switch control strip 84 heretofore mentioned.

The control strip 84 is securely attached at one end 92 to the pilot switch box 67, makes contact at its other end 93 with a shoulder 94 on a rocker element 95, and intermediate its ends makes contact with the switch operating push pin 83 above mentioned.

The rocker element 95 is supported by a pivot pin 96, fixed in a U-shaped structure 88 fixed to the bracket plate 85 between plates 57, and is provided with stop shoulders 97 and 98 which coact with the structure 88 to limit the rocking action thereof. The spring strip 84 yieldably urges the rocker element 95 toward the position shown in Fig. 1 with the shoulder 97 thereof against the structure 88. The rocker element 95 is also provided with a shoulder 99 for coaction with the end 100 of the spring strip 101 which is attached at its other end 102 to the leg 52 of the armature of the electromagnet, the arrangement being such that, when the armature has been advanced into the position shown in Fig. 2, the spring strip 101 yieldably retains the rocker element 95 in a position with its stop shoulder 98 against the structure 88. It will be noted that in this position of the rocker element 95, the spring strip 84 and push pin 83 are held thereby in such position as to hold the pilot switch 63 closed.

It will thus be noted that the rocker element 95 controls the pilot switch 63 and is capable of assuming two positions, the one illustrated in Fig. 1 in which the pilot switch is open, and the other illustrated in Fig. 2 in which the pilot switch is closed.

Provision is made for shifting the rocker element from either position to the other, alternatively, by successive movements of a single control element in the same direction. The control element shown is the push button 13 hereinbefore mentioned. In this instance the button 13 is carried upon the end of a forked stem 103, extending through and guided by the plate 88 and further guided by the fulcrum 96 of the rocker element 95, the pin 96 extending through guide slots 104 formed in the stem. The rocker element 95 is also partially embraced and positioned by the end of the forked stem 103. The stem 103 carries a pointed dog 105 therein rockably supported upon a pin 106 fixed in the stem. The pointed end of the dog 105 projects toward the rocker element 95 and the other end is fashioned to provide a flat face 107 which coacts with leaf spring 108 to yieldably retain the pointed end disposed centrally of the stem 103. The rocker element 95 is provided with a V-shaped cam 109 symmetrically disposed with respect to its fulcrum pin 96 and projecting toward the dog 105, recesses 110 and 111 being formed at the base of the cam 109 at opposite sides of the fulcrum pin 96.

The arrangement is such that with the rocker element 95 in the position shown in Fig. 1, inward movement of the button 13, under pressure, causes the point of the dog 105 to advance along the under face of the cam 109 into and against the base of that recess 110 disposed below the pin 96, and continued advance of the dog thereafter forces the rocker element 95 to rock counter-clockwise toward and into the position of Fig. 2. However, whenever the rocker element 95 is in the position of Fig. 2, inward movement of the button 13, under pressure, causes the point of the dog to advance along the upper face of the cam 109 into and against the base of that recess 111 disposed above the pin 96, and continued advance of the dog thereafter forces the rocker element 95 to rock clockwise toward and into the position of Fig. 1.

It will thus be understood that with the pilot switch 63 open, the armature 51 of the electromagnet retracted, and the switch bar 40 also retracted, so that the main switch is open, all as indicated in Fig. 1, the rocker element 95 may be rocked counter-clockwise by depression of the push-button 13 to thereby close the pilot switch 63 in the manner above described. Of course the circuit 62 (Fig. 7) is closed by the closing of the pilot switch 63 and the coil 46 of the electromagnet is thereby energized, causing the armature 51—52 to move into the Fig. 2 position and thereby actuating the switch bar 40 to close the main switch. As above noted, the rocker element 95 is yieldably retained in the switch closing-position of Fig. 2 by the spring 101 as long as the armature 51—52, to which it is attached, remains in the Fig. 2 position, so that when the operating pressure is released from the push button 13, the latter is returned by its spring 112 to the position shown, without affecting the rocker element 95 or the pilot switch 63.

The several parts thereafter normally remain in the respective positions shown in Fig. 2 until the push button 13 is again depressed. When that occurs the dog 105, coacting with the recess 111 in the rocker element 95 forces the latter to rock into the Fig. 1 position, against the resistance of spring 101, thereby permitting the pilot switch 63 to open and thus break the circuit 62, so that the electromagnet coil 46 becomes deenergized and its armature 51—52 falls, retracting the switch bar 40 and thereby opening the main switch. Again the rocker element 95 remains undisturbed by automatic retraction of the push button 13, and the several parts remain in the positions shown until the push button 13 is again depressed.

Provision is also made for automatically opening the main switch in the event of an overload in the motor circuit. In this instance a second switch 64 and heating coils 65, previously referred to, are utilized for this purpose.

The switch 64 is shown enclosed in a housing 113 of insulating material attached to the mounting plate 14 between the two end plates 20 of the main switch supporting structure. As indicated in Fig. 2, it includes two fixed contacts 114 and cooperating movable contacts 115, like the switch 63 previously described, and is otherwise substantially the same as the latter except that the spring 116 and rocker control plate 117 are so arranged that the switch 64 is normally biased toward closed rather than toward open position. It will be noted that in switch 64 the spring 116 is disposed on the left side (Fig. 2) of the fulcrum point 118 of the control plate 117, in which position the latter is always urged toward the left. It will also be noted that in the left extreme position of the control plate 117 the spring 116 is on the left side of the fulcrum point 119 of the switch carrier plate 120, thereby urging the latter toward switch closing position; but when the control plate 117 is swung toward the right the spring 116 shifts to the other side of the fulcrum point 119, thereby opening the switch with a snap action.

In this instance the end of the control plate 117 of the switch 64 extends through an opening 121 in the housing 113 and projects into the range of movement of two levers 122. As indicated particularly in Fig. 4, levers 122 extend horizontally in opposite directions from the plate 117, each being rockably mounted intermediate its ends upon an appropriate bracket arm 123 fixed to a side of the switch housing 113. The outer or remote ends 124 of the levers 122 overlie the free ends 125, respectively, of separate bi-metallic thermostatic strips 126 of a well known type.

In this instance the thermostatic strips 126 are disposed at opposite sides of the electromagnetic coil 46, each being securely fixed at its lower end 127 in a C-shaped bracket 128 and extending upwardly through a C-shaped bracket 129 to a point adjacent the end 124 of one of the levers 122, as indicated in Fig. 1. A heating coil in the form of a metallic strip 65 is arranged close to and substantially parallel to each of the thermostatic strips 126, so that the latter is influenced by temperature variations in the strip 65. Each heating coil or strip 65 is connected in a side of the work circuit 66, as indicated in Fig. 7, so that the temperature of each corresponds to the load on that side of the work circuit and so that the temperature of the adjacent thermostatic strip also corresponds thereto.

Each heating coil or strip 65 is shown with its ends attached to and supported by the C-shaped brackets 128 and 129 which are in turn mounted upon an elongated block 130 of insulating material attached to the mounting plate 14, the adjacent thermostatic strip 126 being suspended between the heating strip 65 and block 130.

The arrangement is such that should either side of the work circuit 66 becomes overloaded, causing an abnormal rise in temperature in either coil 65, the adjacent thermostatic strip 126, reacting to that temperature rise, will flex and operate its associated lever 122 in a direction to force the control plate 117 toward the right (Fig. 1) thereby causing the switch 64 to open and thus deenergize the coil 46 of the electromagnet. When this occurs, the armature 51—52 of course falls, retracting the switch bar 40 and opening the main switch, thereby breaking the work circuit.

It will of course be understood that as the armature 51—52 falls, carrying the leaf spring 101 with it, the leaf spring 84, acting on the rocker 95, returns the latter to the Fig. 1 position, and at the same time permits the pilot switch 63 to open, so that the electromagnet thereafter remains deenergized until the control button 13 has again been depressed, even though the overload switch 64 in the meantime may have automatically reclosed, as a result of the breaking of the motor circuit and the consequent cooling and reflex action of that thermostatic strip 126 which had caused the switch 64 to open.

It will thus be noted that whenever the circuit is broken by the opening of one of the overload switches 64, the main switch opens, and also the pilot switch 63 opens as a result of the opening of the main switch. In fact the main switch opens whenever any break occurs in the circuit or whenever the voltage therein falls below that required to hold the main switch closed, and whenever the main switch opens, the pilot switch always opens automatically in the manner above described, so that in the event of failure in the main circuit from whatever cause the pilot switch opens automatically. This is important from a practical standpoint because it requires a deliberate act of the operator to re-close the pilot switch in order to effect restarting and thereby avoids accidental restarting before the cause of the failure can be detected and corrected.

From the foregoing it will be noted that I have provided a motor controller of simple and extremely compact design, involving only one pilot switch and one overload switch in addition to the main switch, and yet possessing all of the desirable functional characteristics of the much more complicated and cumbersome motor controlling devices now in common use. It will also be noted that all of the parts may be readily formed and easily assembled at minimum cost, the same being so combined in sub-assembly arrangements as to be readily removable for purposes of inspection, replacement, and repair.

Figure 8:
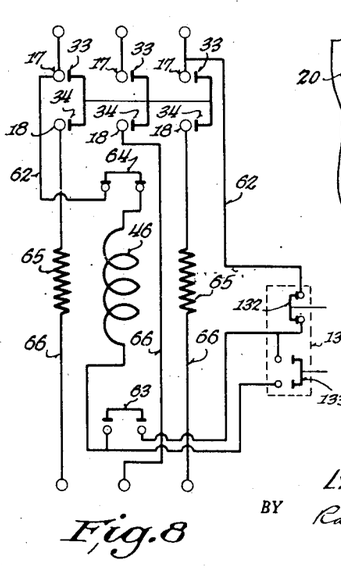

The motor controller described may also readily be placed under remote switch control without modification of the structural parts thereof. Fig. 8 illustrates how the circuits may be modified to provide for remote control. As therein shown, the shunt circuit 62, containing the coil 46 of the electromagnet, the pilot switch 63, and overload switch 64 is extended to a remote control panel 131 having two auxiliary control switches 132 and 133. Switch 132 is a normally closed switch connected in the circuit 62. Switch 133 is a normally open switch disposed in an auxiliary circuit bridged across the pilot switch 63.

The arrangement is such that when the pilot switch 63 is open, as indicated in Fig. 8, the circuit 62 may be closed by momentarily closing the normally open switch 133, so as to energize the coil 46 of the electromagnet and thereby effect actuation of its armature 51—52 and the switch bar 40 into the Fig. 2 position to close the main switch. This movement of the armature is transmitted through the spring 101 to the rocker element 95 in such manner as to close the pilot switch 63, so that on subsequent reopening of the switch 133 the circuit 62 remains closed through the switch 63. When it is desired to reopen the main switch, this may be accomplished by momentarily opening the switch 132, thereby breaking the circuit 62 and de-energizing the coil 46 of the electromagnet. When this occurs, the armature 51—52 falls, retracting the switch bar 40 and opening the main switch, the pilot switch 63 also being reopened by the spring 84 as the spring 101 lowers with the armature.

The motor controller illustrated in Figs. 9 to 13 is similar in many respects to that shown in Figs. 1 to 6, but is simpler and more compact. All of the parts are carried by a mounting plate 14' removably fixed within an appropriate housing 10' having a removable cover 11' having a cupped opening 12' to accommodate the single control button 13'.

The pairs of fixed contacts 17' and 18' of the main switch are arranged in a supporting structure 20' of insulating material strikingly similar to that shown in Figs. 1 and 2, and the movable contacts 33' and 34' are carried by a movable switch actuating bar 40' in a strikingly similar manner. In this instance, however, the switch bar 40' is supported and guided by two pairs of bars 58' which are in turn supported upon and guided by the frame of the electromagnet in a manner to be later described.

The electromagnet shown comprises a coil or winding 46' supported upon the core 47' of a laminated E-shaped field piece in which the laminations are rigidly bound together between flanged frame plates 48', one of which is removably fixed to an appropriate supporting bracket 50' fixed to the mounting plate 14'. The armature 51' of the electromagnet comprises a similar laminated E-shaped structure in which the laminations are bound together between flanged frame plates 52', the armature being supported and guided largely by the pairs of bars 58' above mentioned.

The bars 58' of one pair ride freely upon the exposed face of one of the stationary frame plates 48', the flange 45' at one edge of the plate 48' being cut away, as at 44', to receive and guide the bars, the bars being further guided by the upturned side flanges 43' extending parallel thereto. The other pair of bars 58' are similarly arranged with respect to the opposite frame plate 48'. Both pairs of bars 58' are securely but releasably fixed at their upper ends to the switch actuating bar 40' and at their lower ends to the movable armature 51' of the electromagnet. In this instance, inwardly turned upper ends 42' of the bars project into the switch bar 40' and are releasably held in place by tie bolts 59', the lower ends 41' being turned outwardly and securely clamped against a flange of 60' on a frame plate 52' of the armature by the overlying ends 61' of a clamp bar 62', releasably clamped to the flange 60' by an appropriate screw 64'. The switch bar 40' and the armature 51' are thus rigidly united by the bars 58' for straight line movement, as a unit, in a direction lengthwise of the bars and axially of the electromagnet.

The coil 46' of the electromagnet is controlled by a normally open pilot switch 63' similar in many respects to the pilot switch 63 hereinabove described, it being enclosed in a housing 67' of insulating material fixed to and supported by a bracket plate 85' which in turn is mounted between and releasably interlocked with two upstanding bracket plates 57' in a manner similar to the above described relation between the bracket plate 85 and support 57.

The pilot switch shown at 63' includes two stationary contacts 69', having separate terminals 70', and connectable by a bridge member 72' carrying movable contacts 71'. As in the switch 63, hereinabove described, the bridge member 72' is carried by one end of a rocker plate 73' fulcrumed at its other end 74', a tension spring 77' connecting the movable end of the plate 73' with the movable end 78' of a rocker control plate 79' fulcrumed at its other end 80'. The arrangement is such that the spring 77' always urges the control plate 79' to swing toward the right from the position shown in Fig. 9.

Figure 9:
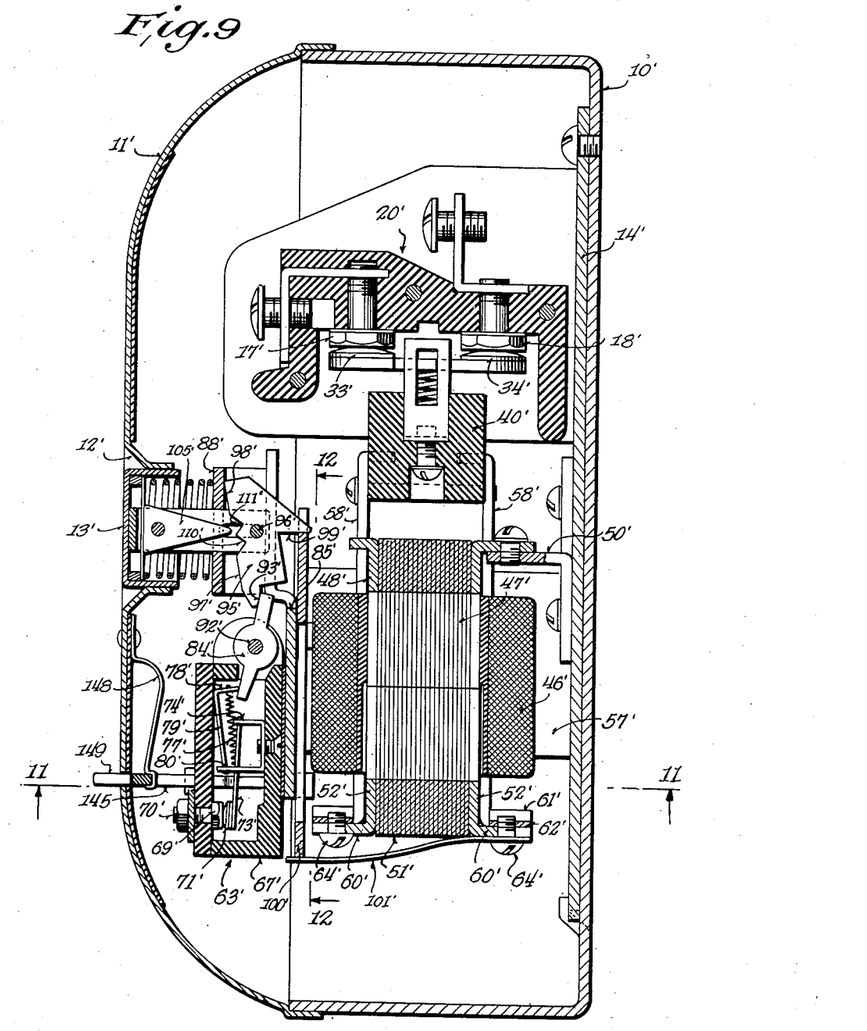
Fig. 9 is a vertical sectional view of an electromagnetic switch embodying the present invention but of somewhat different form.
Figure 10:
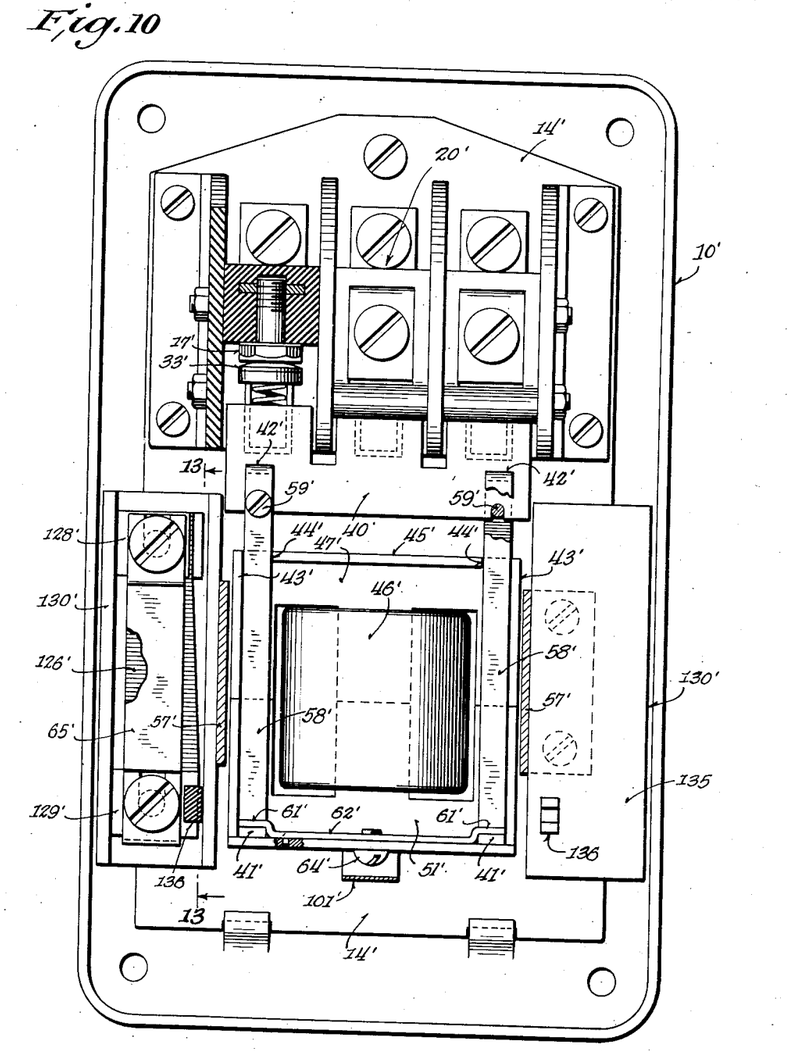
Fig. 10 is a front elevation partly in section of the motor control switch of Fig. 9, with the pilot switch and its control mechanism removed.

It will be understood of course that in the Fig. 9 position of the control plate 79' the position of the spring 77' is such as to yieldably hold the switch carrier plate 73' in the position shown, so that the switch is closed, but that when the control plate 79' is swung toward the right from that position, the spring shifts to the opposite side of the fulcrum point 74' of the switch carrier plate 73', causing the switch to open with a snap action, and to remain open until the control plate 79' is again swung toward the Fig. 9 position, causing the switch to close with a snap action.

In this instance the control plate 79' is controlled by a lever 84' rockably supported on a fixed pivot pin 92' and controlled by a rocker element 95' similar to the element 95 hereinabove described. In this instance one end of the lever 84' bears against the end 78' of the control plate 79' and the other end bears against a shoulder 93' of the rocker element 95'. The rocker element 95' is also provided with a shoulder 99' for coaction with a vertical push plate 100' slidably mounted and guided by and between pairs of hook-like lugs 86' formed on the rear side of the bracket plate 85'. The push plate 100' is yieldably supported at its lower end by one end of a leaf spring 101', which is attached at its other end to the armature 51' for movement therewith.

The arrangement is such that when the armature 51' moves upwardly into the Fig. 9 position to close the main switch, the spring 101' urges the push plate 100' to move upwardly with it into such position as to yieldably retain the rocker element 95' in the position shown, in which position the rocker element yieldably retains the lever 84' and the control plate 79' in such position that the pilot switch 63' is yieldably held closed. Also, whenever the armature 51' is lowered to open the main switch the spring 101' and plate 100' lowers with it, thereby releasing the rocker element 95' and permitting it and the lever 84' to rock in such direction as to permit the control plate 79' to swing toward the right (Fig. 9) and thus induce the pilot switch 63' to open.

Like the rocker element 95, hereinabove described, the rocker element 95' is provided with stop shoulders 97' and 98' which coact with a plate 88' to limit the range of rocking movement thereof, and is also provided with V-shaped recesses 110' and 111' on opposite sides of the pivotal support 96' thereof which coact alternatively with a pointed dog 105' to effect rocking action of the rocker element from either extreme position to the other whenever the push button 13' is depressed.

The arrangement is such that with the several parts in the positions shown in Fig. 9, a depression of the push button 13' will cause the dog 105' to enter the recess 111' and force the rocker element 95' clockwise, forcing the push plate 100' downwardly against the resistance of spring 101', and permitting the control plate 79' to swing toward the right and thereby open the pilot switch 63'. Opening of the pilot switch 63' of course de-energizes the coil 46' of the electromagnet, causing the armature 51' to drop and open the main switch. The main switch remains open until the push button 13' is again depressed, whereupon the dog 105', entering the recess 110', forces the rocker element 95' counter-clockwise, returning it to the position shown in Fig. 9 and thereby closing the pilot switch 63'. Closing of the pilot switch of course energizes the coil 46', causing the armature 51' to rise and thereby close the main switch.

Provision is made for automatically opening the main switch in the event of overload in the work circuit. As in the device hereinabove described, this is accomplished by the heater coils 65' in different sides of the work circuit together with temperature responsive elements 126' associated therewith. In this instance, however, the thermostatic elements 126' are made to act upon the pilot switch 63', thereby obviating the necessity of a second auxiliary switch, such as the switch 64 employed in the device above described.

In this instance each heater coil is in the form of a metallic strip 65' detachably supported at its ends by C-shaped brackets 128' and 129' mounted within a channel-like structure 130' of insulating material bolted or otherwise attached to one or the other of the bracket plates 57'. A removable cover 135 is provided for each structure 130'. A bi-metallic thermostatic strip 126' is anchored at one end in bracket 128' and extends close to the heater strip 65' and loosely into the bracket 129'. A push bar 136 of insulating material rests at one end against the free end 125' of each thermostatic strip and extends through the cover 135 into engagement with one end of a lever 138 fulcrumed on a bracket 139 attached to a side of the pilot switch housing 67'. The other end 140 of each lever 138 projects into the housing 67' and overlies the switch-carrying rocker plate 79'. The lever ends 140 are normally yieldably sustained clear of the rocker plate 79' by a suitable spring 141.

The arrangement is such that, in the event of an overload in the work circuit, a resultant rise in temperature in either of the coils 65', and its adjacent thermostatic strip 126', will cause the strip 126' to flex and actuate the associated push bar 136 in such direction as to rock one of the levers 138 and thereby force the rocker plate 73' and switch contacts 71' away from the contacts 69' so as to open the pilot switch 63'. It will be understood of course that as the temperature of the strip 126' rises it exerts an increasing upward pressure against the push bar 136 until that pressure is sufficient to overcome the resistance to opening movement of the switch element 73', so that when the switch 63' does open, it opens with a snap action.

It will also be understood that, when the pilot switch 63' is opened in this manner, the coil 46' of the electro-magnet becomes de-energized and the armature 51' lowers to open the main switch and to permit the rocker element 95', lever 100', and control plate 79', to shift into the positions normally assumed by them when the pilot switch is open.

A special reset mechanism is preferably provided to prevent re-closing of the pilot switch 63' and consequently of the main switch, until the reset mechanism has been manipulated. For this purpose a spring detent 142 is provided adjacent the outer end 143 of each lever 138 and designed to retain the same against return movement after it has been actuated by the thermostatic strip 126' and bar 136 into switch opening position. As illustrated particularly in Fig. 11, each detent 142 comprises a spring strip having a tooth formation 144 adapted to enter beneath and support the end 143 of the adjacent lever to support the latter against downward movement after it has been elevated by its coacting push bar 136.

Figure 11:
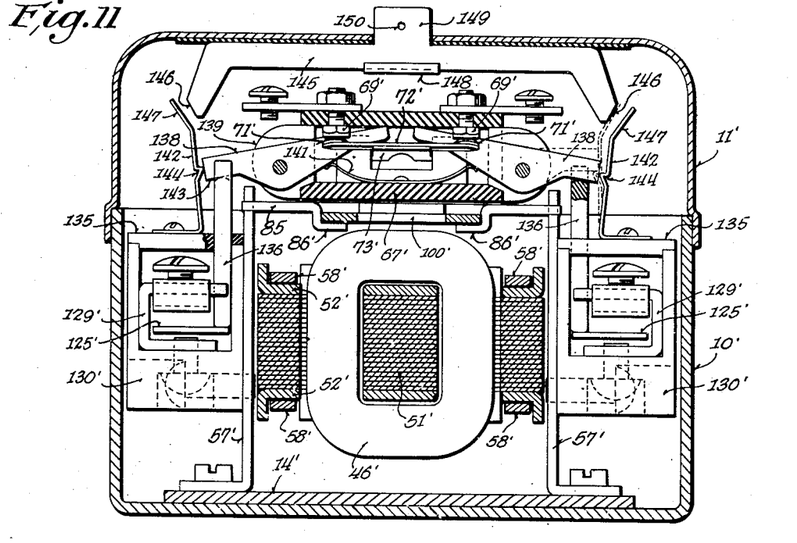
Fig. 11 is a horizontal sectional view taken along the section line 11—11 of Fig. 9.
Figure 12:
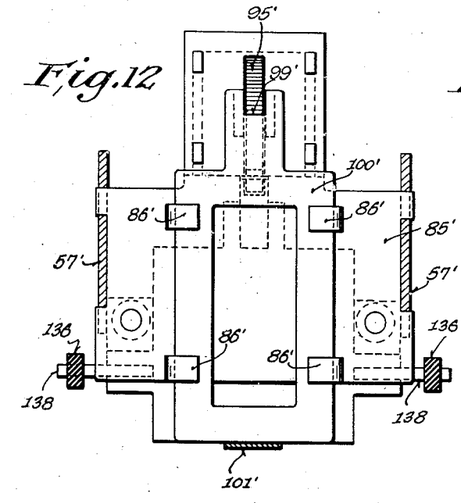
Fig. 12 is a vertical sectional view taken along the line 12—12 of Fig. 9.
Figure 13:
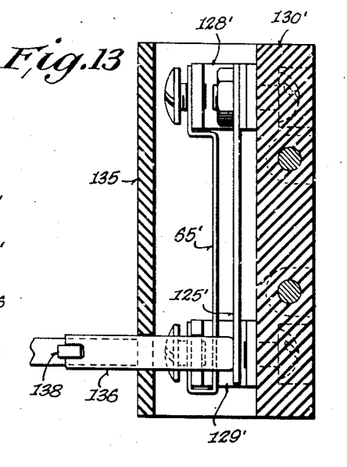
Fig. 13 is a vertical sectional view taken along the line 13—13 of Fig. 10.

Both detents 142 may be forced entirely clear of their associated lever ends 143, so as to release the latter, by a reset bar 145 having cam-like end portions 146 arranged to coact with and spread apart the inclined end portions 147 of the detents when the bar 145 is depressed (Fig. 11). In this instance the bar 145 is yieldably supported against the interior cover 11' by a spring 148 mounted on the cover, the bar having a flat projection 149 extending through and guided by an appropriate opening in the cover, the projection 149 constituting a convenient means for depressing the bar 145 into wedging contact with the detents 142.

It will thus be noted that after the pilot switch 63' has been opened by actuation of either of the levers 138, the cooperating detent 142 normally functions to hold the actuated lever 138 in such position as to hold the switch 63' open, thereby making it impossible to close the switch 63' until after the reset bar 145 has been depressed in the manner described. In some instances it may be desirable to permit reclosing of the switch 63' after it has been automatically opened by one of the levers 138 in response to the thermal unit, without requiring separate manipulation of the reset bar 145. This may be accomplished by fixing the bar 145 in depressed position by passing a pin through a hole 150 in the bar after the hole has been lowered beneath the interior surface of the cover 11'. In that depressed position of the bar 145, the ends 146 of the detents 142 are spread apart so as to render the latter ineffective upon the levers 138.

Various changes may be made in either embodiment of the invention hereinabove specifically described without departing from or sacrificing the advantages of the invention as defined in the appended claims.

I claim:

1. In a circuit controller the combination of a main switch for controlling a circuit, electromagnetic means energized from the circuit for operating said main switch, a pilot switch operable to effect energization and de-energization of said electromagnetic means, an element alternatively operable to close or open said pilot switch, and means for resisting opening of said pilot switch while said electromagnet is energized, whereby said pilot switch functions as a start switch, a holding switch, and a stop switch.

2. In a circuit controller the combination of a main switch for controlling a circuit, electromagnetic means energized from the circuit for closing said main switch, a pilot switch operable to effect energization and de-energization of said electromagnetic means, an element alternatively operable to close or open said pilot switch, and means responsive to opening of said main switch for opening said pilot switch.

3. In a circuit controller the combination of a main switch for controlling a circuit, electromagnetic means energized from said circuit for operating said main switch, a pilot switch operable to effect energization and de-energization of said electromagnetic means, said pilot switch being biased toward open position, a control element alternatively operable to close or open said pilot switch, and additional means normally effective to hold said pilot switch closed while said main switch is closed and for effecting opening of said pilot switch in response to opening of said main switch.

4. In a circuit controller the combination of a main switch for controlling a circuit, an electromagnetic actuator for said switch, electrical connections through which said electromagnetic actuator is energizable from the circuit, a control element alternatively operable to close and open said connections, and additional means operable to open said connections in response to opening of said main switch.

5. In a circuit controller the combination of a main switch for controlling a circuit, an electromagnetic actuator for said switch, electrical connections through which said electromagnetic actuator is energizable from the circuit, a control element having a single actuating movement, means responsive to actuation of said element for closing and opening said connections alternatively, and means operable to open said connections in response to opening of said main switch.

6. In a circuit controller the combination of a main switch, an electromagnetic actuator therefor, an element having an actuating movement and an idle movement, and means responsive to actuating movements of said element for alternatively energizing and de-energizing said actuator, said last named means including switch means operable in response to switch-opening movement of said actuator.

7. In a circuit controller the combination of a main switch, an electromagnetic actuator therefor, an element having an actuating movement and an idle movement, means responsive to actuating movements of said element for alternatively energizing and de-energizing said actuator, said means including switch means operable in response to switch opening movement of said actuator, and means effective to de-energize said actuator independently of said element.

8. In a circuit controller the combination of a main switch, an electromagnetic actuator therefor, switch means for controlling energization of said actuator and automatically operable in response to switch-opening movement of the latter, said switch means including a single control element operable to effect energization and deenergization of said actuator alternatively, and means operable to effect de-energization of said actuator independently of said element.

9. In a circuit controller the combination of a main switch for controlling a circuit, an electromagnetic actuator for said switch, switch means for controlling said actuator and operable in response to switch-opening movement of the latter, said switch means including a single control element alternatively operable to effect energization and de-energization of said actuator, and means responsive to the load on said circuit for effecting de-energization of said actuator independently of said element.

10. In a controller for a multi-sided circuit the combination of a multiple switch alternatively operable to close the sides of the circuit and to open the sides thereof, an electromagnetic actuator for said multiple switch, switch means for controlling said actuator and automatically operable in response to switch-opening movement of the latter, said switch means including a single control element alternatively operable to effect energization and deenergization of said actuator, and means responsive to an overload condition on any of a plurality of sides of the circuit for de-energizing said actuator.

11. In a controller for a multi-sided circuit the combination of a multiple switch alternatively operable to close the sides of the circuit and to open the sides thereof, an electromagnetic actuator for said multiple switch, electrical connections through which said actuator is energizable from the circuit, an element alternatively operable to close and open said connections to thereby effect energization and de-energization of said actuator, means responsive to switch-opening movement of said actuator for opening said connections, and means responsive to an overload condition in any of a plurality of sides of the circuit for opening said connections to thereby de-energize said actuator.

12. In a controller for a multi-sided circuit the combination of a multiple switch alternatively operable to close the sides of the circuit and to open the sides thereof, an electromagnetic actuator for said multiple switch, a pilot switch for controlling said actuator, an element movable to close and open said pilot switch alternatively, and means responsive to an overload condition on any of a plurality of sides of the circuit for opening said pilot switch and thereby to de-energize said actuator.

13. In a controller for a multi-sided circuit the combination of a multiple switch alternatively operable to close the sides of the circuit and to open the sides thereof, an electromagnetic actuator for said multiple switch, electrical connections through which said actuator is energizable, a switch in said connections normally effective to control said actuator, a normally closed switch in said connections, and means responsive to an overload condition in any of a plurality of sides of the circuit for opening said last named switch and thereby to de-energize said actuator.

14. In a circuit controller the combination of a main switch for controlling a circuit, an electromagnetic actuator for said switch, electrical connections through which said actuator is energizable, a pilot switch in said connections normally effective to control said actuator, a second normally closed switch in said connections, means responsive to a load on the circuit for opening said normally closed switch, means for closing and opening said pilot switch independently of said normally closed switch, and means for opening said pilot switch in response to switch-opening movement of said actuator.

15. In a circuit controller the combination of a main switch for controlling a circuit, an electromagnetic actuator for said switch, electrical connections through which said actuator is energizable from the circuit, a pilot switch in said connections for controlling said actuator and operable in response to switch-opening movement of the latter, means responsive to a load on said circuit for opening said connections, and means operable independently of said last named means for closing and opening said pilot switch.

16. In a circuit controller the combination of a main switch for controlling a circuit, an electromagnetic actuator for said switch, electrical connections through which said actuator is energizable from the circuit, means responsive to a load on the circuit for opening said connections, a pilot switch in said connections operable in response to switch-opening movement of said actuator, means operable independently of said last named means for opening and closing said pilot switch, and manually releasable means normally effective to prevent closing of said connections after the latter have been opened by said load responsive means.

17. In a circuit controller the combination of a main switch for controlling a circuit, an electromagnetic actuator for said switch, electrical connections through which said actuator is energizable, a pilot switch in said connections normally operable to close and open the latter and operable in response to switch-opening movement of said actuator, means responsive to the load on the circuit for opening said connections, manually releasable means normally effective to prevent closing of said connections after the latter have been opened by said load responsive means, and means for rendering said last named means ineffective.

18. In a circuit controller the combination of a main switch, an electromagnetic actuator therefor, and means for controlling said actuator, said means including a control element moveable to effect energization or de-energization of said actuator, and remote control means operable independently of said element to effect energization or de-energization of said actuator.

19. In a circuit controller the combination of a main switch, an electromagnetic actuator therefor, a moveable control element, means alternatively effective to energize said actuator in response to movement of said element in one direction and to de-energize said actuator in response to movement of said element in the same direction, and additional remote control means for said actuator.

20. In a circuit controller the combination of a main switch, an electromagnetic actuator therefor, a moveable control element, switch means alternatively effective to energize said actuator in response to movement of said element in one direction and to de-energize said actuator in response to movement of said element in the same direction, and means responsive to a drop in voltage for opening said switch means.

21. In a circuit controller the combination of a main switch, an electromagnetic actuator therefor, a depressable control element, switch means alternatively effective to energize said actuator upon depression of said element and to de-energize said actuator upon depression of said element, and means responsive to a drop in voltage for opening said switch means.

22. In a circuit controller the combination of a main switch for controlling a circuit, electromagnetic means energized from the circuit for operating said main switch, a pilot switch operable to effect energization and de-energization of said electromagnetic means to thereby effect opening and closing of said main switch, means for opening and closing said pilot switch, and means responsive to said electromagnetic means for holding said pilot switch closed when said main switch is closed, said last named means being yieldable to permit opening of said pilot switch when said main switch is closed to thereby effect opening of said main switch.

23. In a circuit controller the combination of a main switch for controlling a circuit, electromagnetic means energized from said circuit for operating said main switch, a pilot switch operable to effect energization and deenergization of said electromagnetic means, means for closing and opening said pilot switch to thereby effect closing and opening of said main switch, additional means for effecting opening of said main switch, and means for insuring opening of said pilot switch whenever said main switch is opened.

24. In a circuit controller the combination of a main switch for controlling a circuit, electromagnetic means energized from the circuit for closing said main switch, a single pilot switch alternatively operable to effect energization or de-energization of said electromagnetic means, and means responsive to a drop in voltage in said circuit for opening said pilot switch.

LYLE BEEMAN.